(12) United States Patent
Juan

(10) Patent No.: US 6,364,044 B1
(45) Date of Patent: Apr. 2, 2002

(54) CONTROL SYSTEM FOR MOTOR-ASSISTED BICYCLE

(76) Inventor: Chih-Chen Juan, No. 278, Lan Tan, Tung-Yang, Hsinchun Chiayi City (TW)

( * ) Notice: Subject to any disclaimer, the term of this patent is extended or adjusted under 35 U.S.C. 154(b) by 0 days.

(21) Appl. No.: 09/526,258

(22) Filed: Mar. 16, 2000

(51) Int. Cl.⁷ .................. B62K 11/00; B62M 23/02; F16H 7/12
(52) U.S. Cl. .................. 180/206; 474/133; 474/135
(58) Field of Search .................. 474/133, 135, 474/101, 114–117; 180/205, 206, 207; 74/502.02, 502.4, 506.06; 267/235, 265, 177, 255

(56) References Cited

U.S. PATENT DOCUMENTS

| 3,192,772 A | 7/1965 | Tarter ..................... 180/206 |
| 3,939,932 A | 2/1976 | Rosen ..................... 180/206 |
| 3,944,957 A | 3/1976 | Kotos et al. ............. 335/174 |
| 4,019,949 A | 4/1977 | Greisman ................ 156/582 |
| 4,027,897 A | 6/1977 | Hildebrand ............. 280/631 |
| 4,168,758 A | 9/1979 | Holt ........................ 180/206 |
| 4,263,998 A | 4/1981 | Moriya ................... 74/502.4 |
| 4,334,438 A | 6/1982 | Mochida ................. 74/502.4 |
| 5,758,735 A | 6/1998 | MacCready, Jr. et al. ... 474/119 |

*Primary Examiner*—David A. Bucci
*Assistant Examiner*—Marcus Charles
(74) *Attorney, Agent, or Firm*—Pro-Techtor International Services

(57) ABSTRACT

A control system for a motor-assisted bicycle comprising: a control unit, controlling supplemental power; a sensor unit; and a cable. The sensor unit further comprises a holding plate, mounted on the motor-assisted bicycle, a lever, hingedly mounted on the holding plate, an engaging element, mounted on a far end of the lever, engaging with the chain from above, and a spring, pressing the engaging element on the chain. The cable connects the lever with the control unit. Changing tension of the chain causes a movement of the lever which is transmitted by the cable to the control unit for controlling the supplemental power.

7 Claims, 10 Drawing Sheets

CONTROL SYSTEM FOR MOTOR-ASSISTED BICYCLE

BACKGROUND OF THE INVENTION

1. Field of the Invention

The present invention relates to a control system for a motor-assisted bicycle, particularly to a control for a motor-assisted bicycle which works mechanically.

2. Description of Related Art

Nowadays, the main source of air pollution is exhaust gas generated by traffic vehicles. The problem of air pollution has become increasingly grave, and demand for traffic vehicles not polluting the air is more and more urgent.

Obviously, bicycles are most suitable vehicles for pollution-free traffic. However, riding a bicycles entirely relies on human effort and thus has physical limitations. Bicycles are not suitable for long distances. A conventional bicycle has a chain wheel and a sprocket which have widely differing numbers of teeth. Therefore accelerating the bicycle is hard, and cycling uphill, especially at steep climbing angles, forces a cyclist to get off and to push the bicycle.

To compensate for the shortcomings of conventional bicycles at long distances and when starting or going uphill, motor-assisted bicycles have appeared. A motor-assisted bicycles mostly uses an electric motor, providing additional power for accelerating and climbing, so that the cyclist will not be strained when accelerating or going uphill.

The ideas of a motor-assisted bicycle and of an electrically driven motorcycles are different. A motor-assisted bicycle relies on a mixture of human and electric power, with electric power supplementing human power when starting, accelerating or climbing. On a level street, less or no supplemental electric power is needed. Downhill, electric power is completely unnecessary, and human physical power as well as electric power are saved.

Therefore, for a motor-assisted bicycle a motor and a battery of minimum size are sufficient and will not add much weight to the bicycle. For proper operation, instant and correct sensing of load during cycling needs to be available to control output of electric power.

Conventional control systems for motor-assisted bicycles mainly divide in torsion control systems, speed measuring systems, combined torsion and speed measuring systems, and manual systems. Each of these types of control systems gather signals which are fed into a microcomputer where output signals are generated for controlling electric power output.

Motor assisted bicycles are designed according to needs of environmental protection. However, control systems thereof still have many problems.

First, conventional control systems for motor-assisted bicycles need a complicated controller with software to control electric output power, which is expensive. Moreover, control by a microcomputer is not capable to adapt completely to changes of load during cling. Therefore, starting the bicycle or climbing will not lead to an immediate response in electric power output and thus are not well dealt with.

Furthermore, conventional control systems for motor-assisted bicycles control electric power output according to a linear curve or only by switching on and off. Thus slight loads lead to full electric power or superfluous output thereof, wasting electric energy and reducing mileage.

Furthermore, conventional control systems for motor-assisted bicycles react only slowly to load changes. Then slow starting reactions set in, and, on the other hand, switching off of electric power in the event of sudden braking is belated. This leads to extended braking ranges and the risk of skidding.

Finally, conventional control systems for motor-assisted bicycles are not adjustable, having software that follows fixed control patterns. Changing the control behavior of a conventional control system is difficult. Yet there is a need to adapt the control behavior to various users, e.g., robust cyclists who want to exercise, where electric energy is wasted, or weaker cyclists demanding more assistance.

Therefore, conventional control systems for motor-assisted bicycles do not control electric power output in a satisfactory way. For this reason, some conventional control systems provide an extra manual switch for additional control. However, this complicates conventional control systems even more and makes usage more awkward.

SUMMARY OF THE INVENTION

It is the main object of the present invention to provide a control system for a motor-assisted bicycle which is simple and inexpensive.

Another object of the present invention is to provide a control system for a motor-assisted bicycle which instantly measures load changes and generates quick responses to assist starting and climbing effectively while saving energy.

A further object of the present invention is to provide a control system for a motor-assisted bicycle which is adaptable to various users with various physical demands and cycling behavior patterns thereof.

The present invention can be more fully understood by reference to the following description and accompanying drawings.

DETAILED DESCRIPTION OF THE PREFERRED EMBODIMENTS

Figure 1:
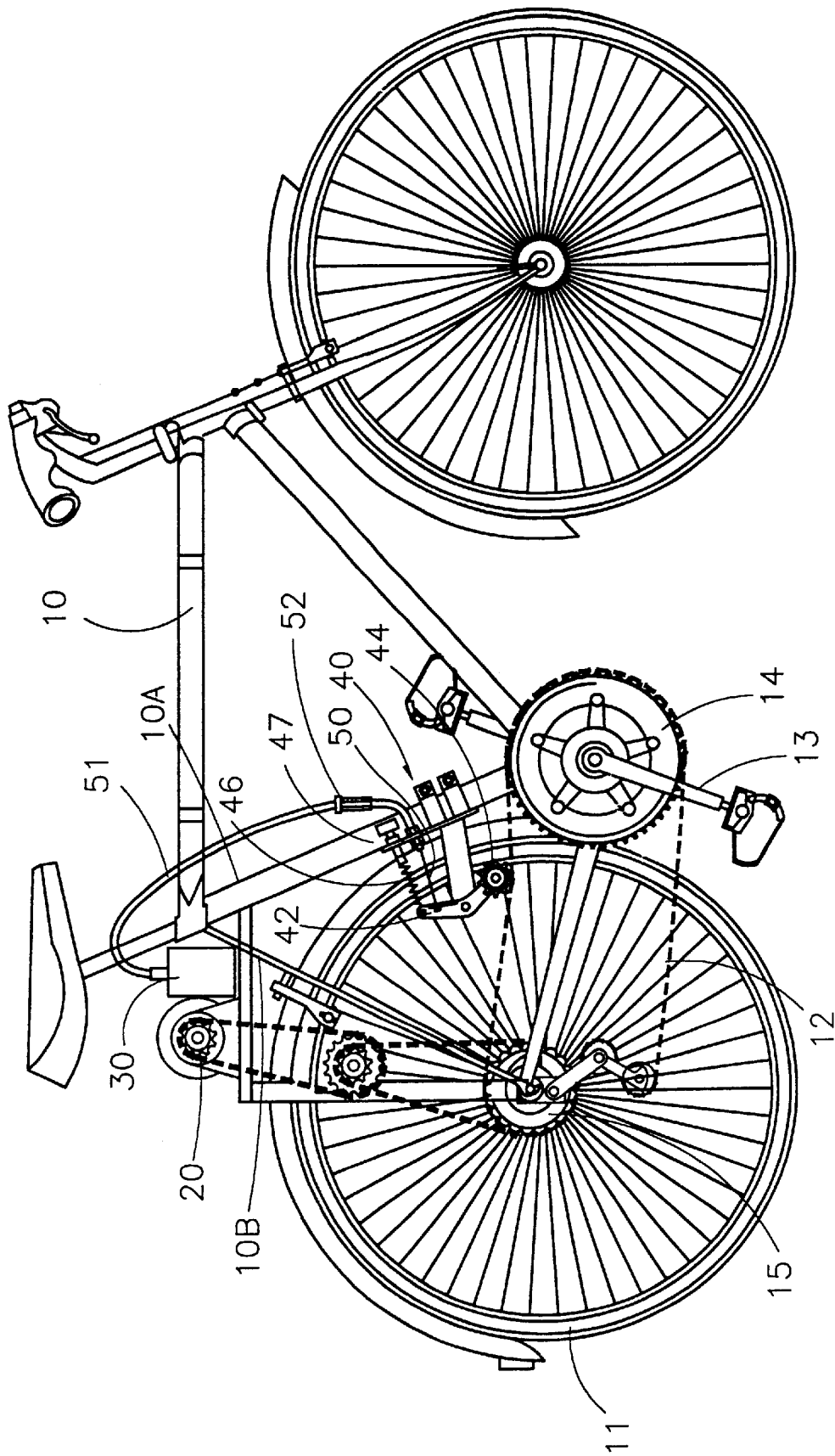
FIG. 1 is a side view of the control system for a motor-assisted bicycle of the present invention in conjunction with a bicycle.

The control system for a motor-assisted bicycle of the present invention is used in conjunction with a bicycle 10, having a rear wheel 11, a chain 12, pedals 13, a chain wheel 14, and a sprocket 15, the bicycle defining upward and downward directions. The rear wheel 11 is driven by a supplementary driving device 20. Driving the bicycle requires a torsional force on the rear wheel 11 to overcome a load. The control system for a motor-assisted bicycle of the present invention in a first embodiment mainly comprises: a control unit 30, mounted on the bicycle 10 and controlling power output from the driving device 20; and a sensor unit 40, mounted close to the chain 12. The sensor unit 40 measures the torsional force by sensing a tension of the chain 12 and passes corresponding information to the control unit 30. The control unit 30 thereupon generates an output signal, so as to adapt power output of the driving device 20 to the load.

Figure 2:
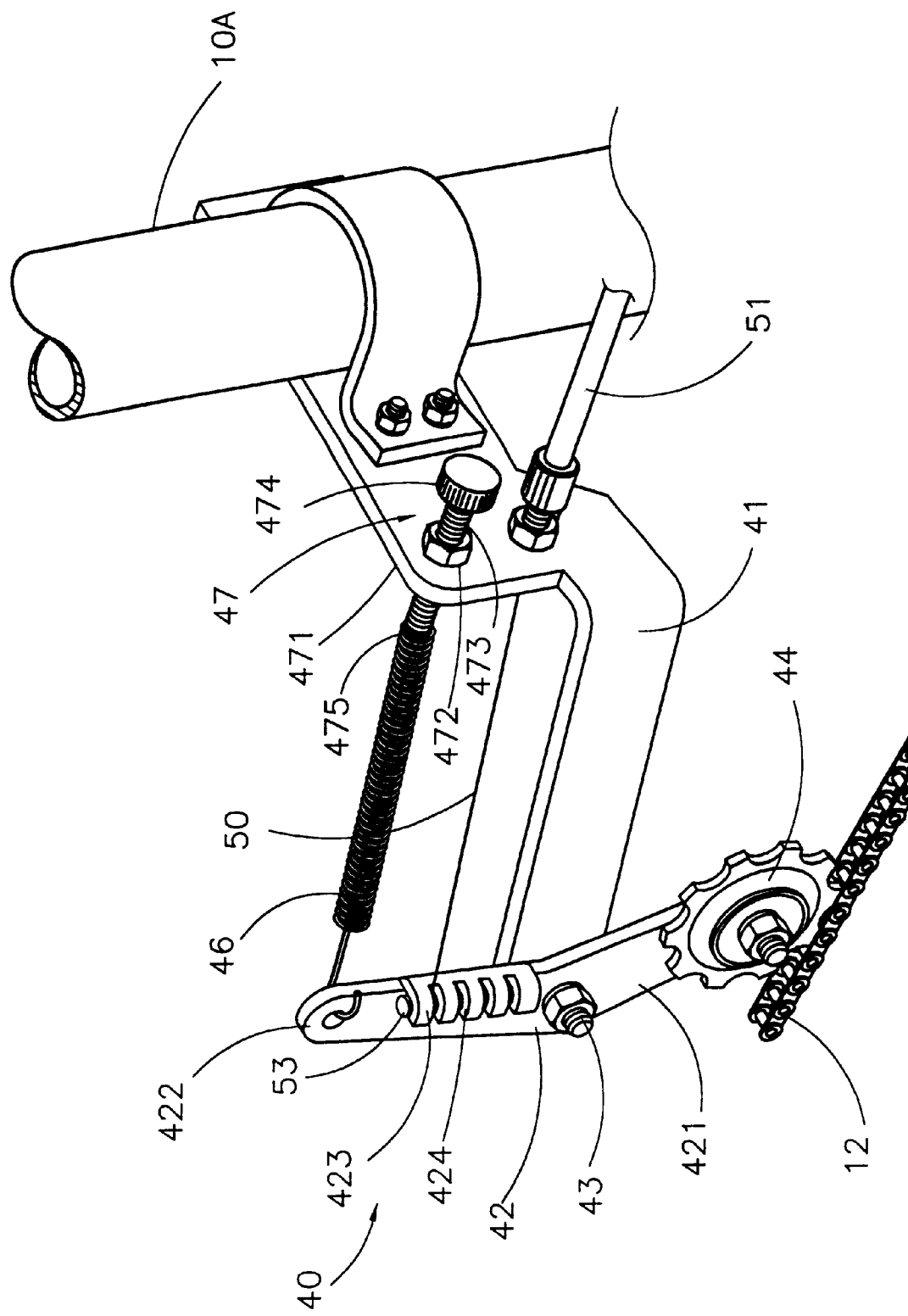
FIG. 2 is a perspective view of the present invention in the first embodiment.

Referring to FIGS. 1 and 2, the sensor unit 40 mainly comprises: a holding plate 41; fixed on a frame tube of the bicycle 10 and having a far end; a lever 42, hingedly mounted on the holding plate 41 close to the chain 12; a bolt 43, connecting the holding plate 41 and the lever 42; a pinion 44 on the lever 42; a spring 46; an adjusting mechanism 47; and a cable 50. The lever 42 has a contact arm 421, extending downward, and a pulling arm 422, extending upward. The contact arm 421 and the pulling arm 422 meet at a central position, passed through by the bolt 43. The contact arm 421 has a free lower end on which the pinion 44 is mounted. The pinion 44 engages with the chain 12 from above. The pulling arm 422 has a free upper end which is connected to the adjusting mechanism 47 by the spring 46. The spring 46 has an elastic force that pulls aside the upper end of the pulling arm 422, so that the pinion 44 is pressed on the chain 12 with a pressing force. Variations in the tension of the chain 12 cause the pinion 44 to move upward and downward. The cable 50 has a near end, to which a blocking piece 53 is attached, and passes through a flexible guiding tube 51. The cable 50 leads from the lever 42 to the control unit 30, transmitting a movement of the sensor unit 40 to the control unit 30 for changing the output signal thereof.

The control unit 30, caused by movements of the sensor unit 40, as transmitted by the cable 50, changes the output signal thereof. Thus the power output of the driving device 20 follows the movements of the lever 42.

As shown in FIG. 2, the adjusting mechanism 47 comprises: a fixed plate 471; a nut 472, fixed on the fixed plate 471; an adjusting screw 473, passing through the nut 472, having a tip and a head end opposite thereto which carries a grooved head 474 to allow to turn the adjusting screw 473 manually; and a connecting part 475 on the tip of the adjusting screw 473. The spring 46 is hooked into the connecting part 475, connecting the adjusting mechanism 47 and the pulling arm 422 of the lever 42. The elastic force of the spring 46 is adjusted by turning the adjusting screw 473, regulating the pressing force of the pinion 44 on the chain 12.

Figure 3:
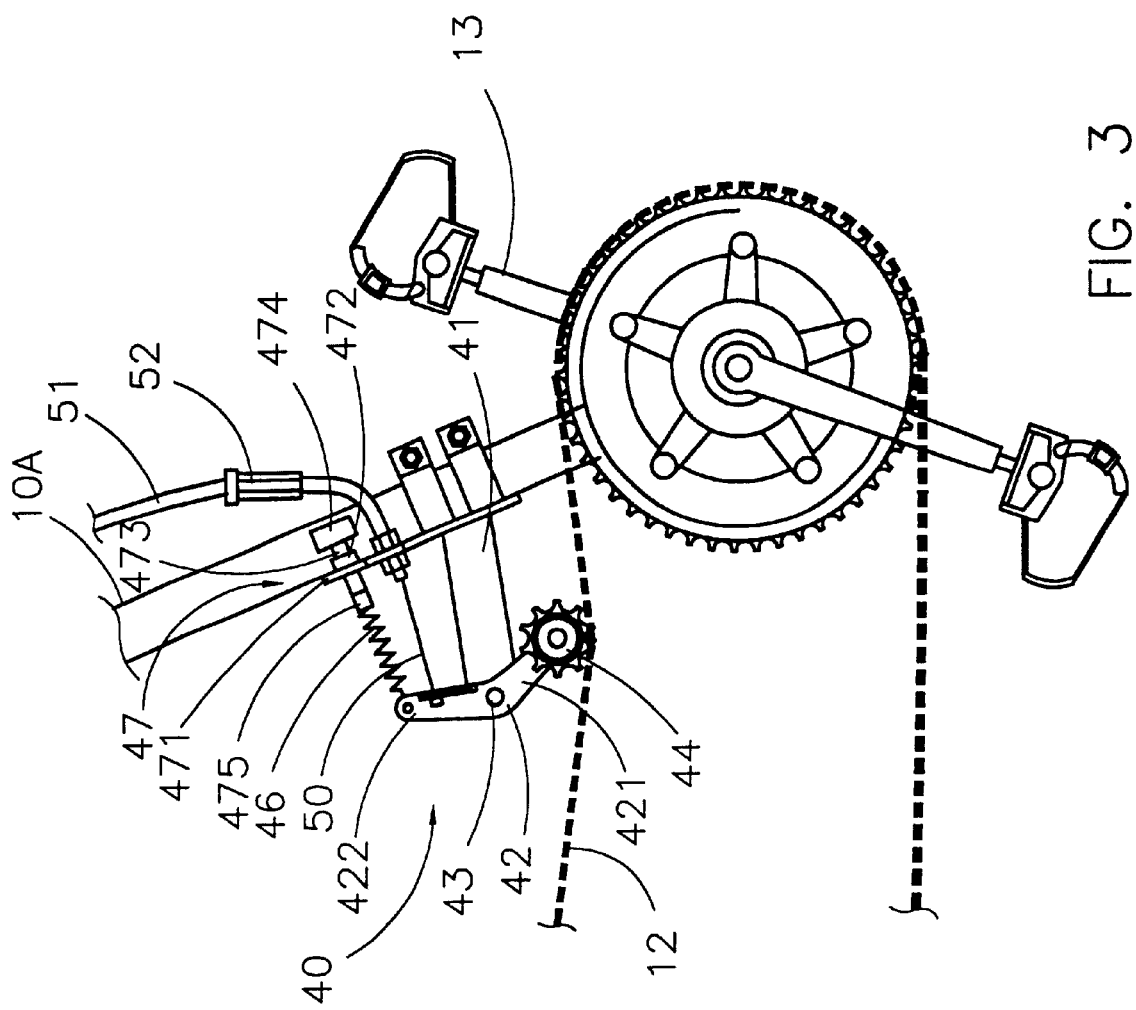
FIG. 3 is a side view of the present invention in the first embodiment at low load of the bicycle.
Figure 4:
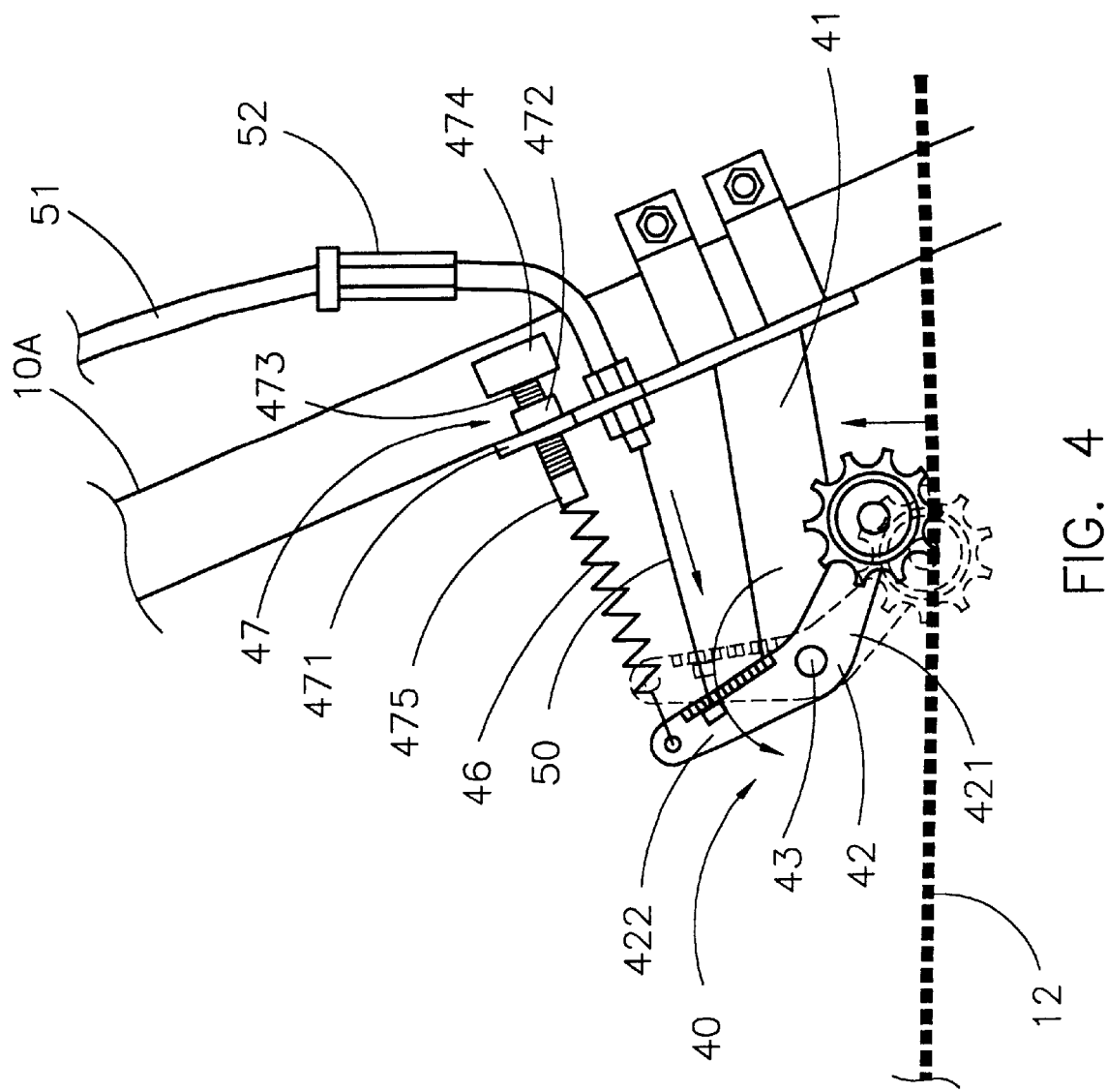
FIG. 4 is a side view of the present invention in the first embodiment at high load of the bicycle.

Referring to FIG. 3, when the bicycle is operated at low load, the chain 12 has little tension. With the sensor unit 40 installed, the pinion 44 thereof presses on the chain 12 with the pressing force, deflecting the chain 12 downward.

Referring to FIG. 3, at a higher load of the bicycle, the chain 12 has increased tension and is less deflected by the pressing force of the pinion 44. Then the pinion 44 has a higher position, resulting in the lever 42 moving aside and pulling on the cable 50. The cable 50 in turn drives a movement of the control unit 30. When the load of the bicycle decreases again, the tension of the chain 12 decreases, too, and, driven by the elastic force of the spring 46, the pinion 44 moves down to a state shown in FIG. 3.

The main characteristic of the sensor unit 40 is that, by movements of the pinion 44 and the lever 42, the load of the bicycle is correctly and instantly followed. When the load of the bicycle is high, e.g., at starting or climbing, the tension of the chain 12 has a maximum value, leading to extreme high-load positions of the pinion 44 and the lever 42. Then the control unit 30 issues a maximum output signal for maximum power output of the driving device 20. On the other hand, when the load of the bicycle is low, e.g., on a level road, the tension of the chain 12 has a minimum value, leading to extreme low-load positions of the pinion 44 and the lever 42. Then the control unit 30 issues a minimum output signal for minimum or no power output of the driving device 20. This saves electrical energy. Instant adapting of the sensor unit 40 to the load of the bicycle, facilitates riding the bicycle when starting and going uphill, while saving electrical energy and achieving a high range.

Since displacements of the lever 42 are proportional to changes in the load of the bicycle, the control unit 30 just needs to follow displacements of the cable 50 to change the output signal thereof for controlling the power output of the driving device 20. No calculation by software is necessary for controlling the power output of the driving device 20, simplifying the design of the control unit 30.

The movement of the sensor unit 40 is entirely dependent of the tension in the chain 12. Any change of force on the pedals 13 is sensitively followed. Stronger pedaling immediately leads to an increased power output of the driving device 20. Ceased pedaling releases the tension of the chain 12 and lets the pinion 44 drop, resulting in no power output of the driving device 20. Starting and climbing immediately increases, the power output, while braking, accompanied by ceased pedaling, immediately stops the power output of the driving device 20. Thus continued power output of the driving device 20 during braking is prevented.

Another characteristic of the sensor unit 40 is that by mechanical adjusting, the power output is adaptable to the load of the bicycle for optimal operating. Thereby the sensor unit 40 is adjustable to needs of various users.

Referring again to FIG. 3, by tightening the adjusting screw 473 of the adjusting mechanism 47, the elastic force of the spring 46 is increased. This leads to a lower power output of the driving device 20 under unchanged load conditions. On the opposite, by loosening the adjusting screw 473 of the adjusting mechanism 47, the elastic force of the spring 46 is decreased. This leads to a higher power output of the driving device 20 under unchanged load conditions. Therefore, a physically robust user will increase the elastic force of the spring 46, saving electrical energy, an a weaker user will decrease the elastic force of the spring 46 for increased cycling assistance.

As further shown in FIG. 3, the flexible guiding tube 51 has a threaded end piece 52. Turning the threaded end piece 52 adjusts how far the cable 50 extends out of the flexible guiding tube 51. Thus relative positions of the cable 50 and of the lever 42 are adjustable for calibrating the control unit 30.

Figure 5:
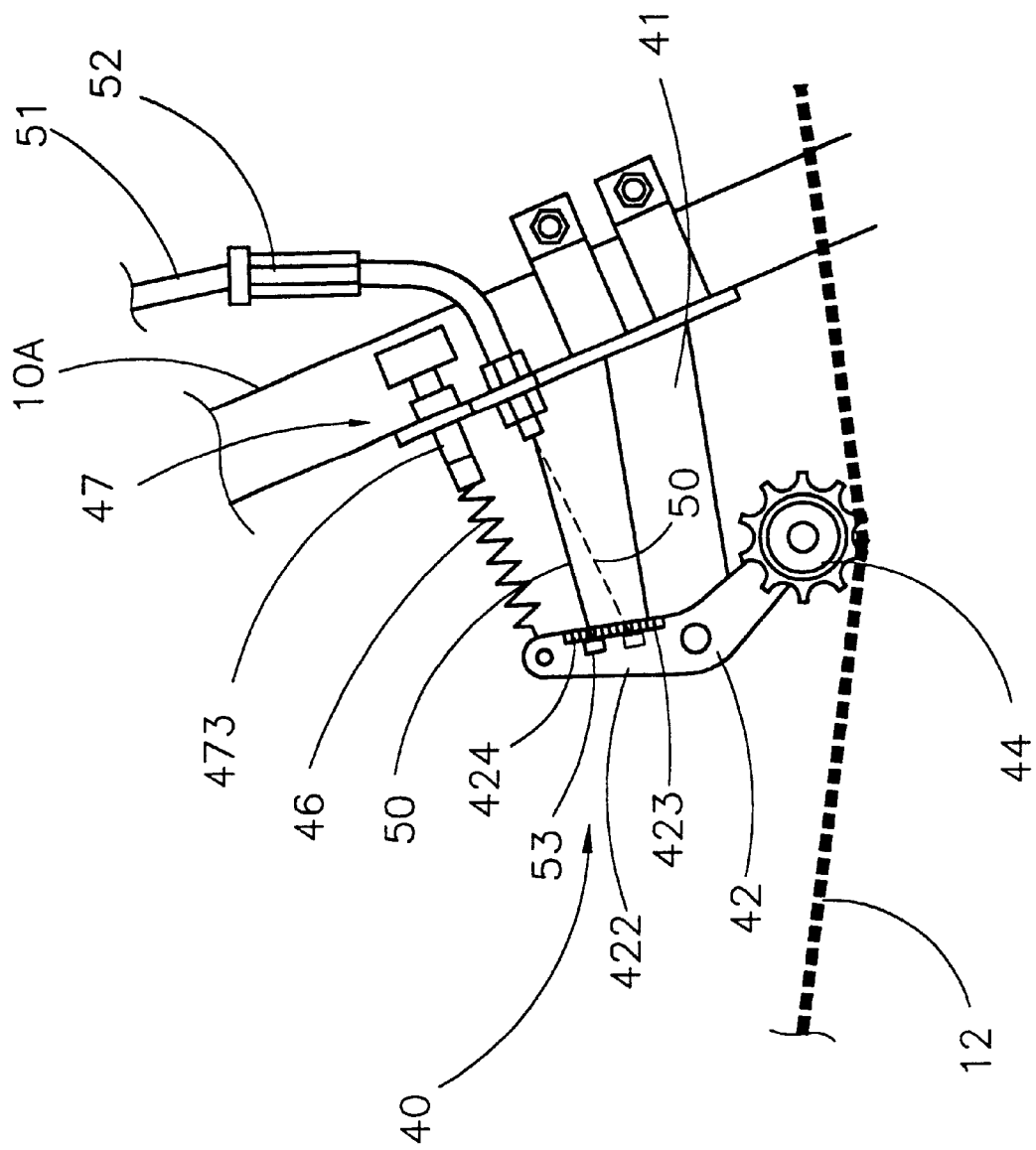
FIG. 5 is a schematic illustration of adjusting of the present invention in the first embodiment.

Referring to FIG. 5, a connecting plate 423 is fixed on the pulling arm 422 of the lever 42, extending along the pulling arm 422. Several incisions 424 are cut into the connecting plate 423 at various heights. The cable 50 at the near end thereof is inserted in one of the incisions 424 and held there by the blocking piece 53. With this arrangement, a lever arm is set up, having a length that extends from the bolt 43 as an axis to the blocking piece 53, where a pull on the cable 50 is exerted when the lever 42 is moved. By choosing one of the incisions 424 to hold the blocking piece 53 of the cable 50, the length of the lever arm is determined. This allows to vary the displacement of the cable 50 as a function of the displacement of the lever 42. Increasing the length of the lever arm leads to a larger displacement of the cable 50, and decreasing the length of the lever arm leads to a smaller displacement of the cable 50.

The adjusting mechanism 47, the threaded end piece 52 and the incisions 424 allow to adjust the sensor unit 40, the cable 50 and the control unit 30 against each other for a correct moving behavior. Moreover, individual demands of users for output power behavior are readily satisfied.

The control unit 30 in this embodiment is explained below.

Figure 6A:
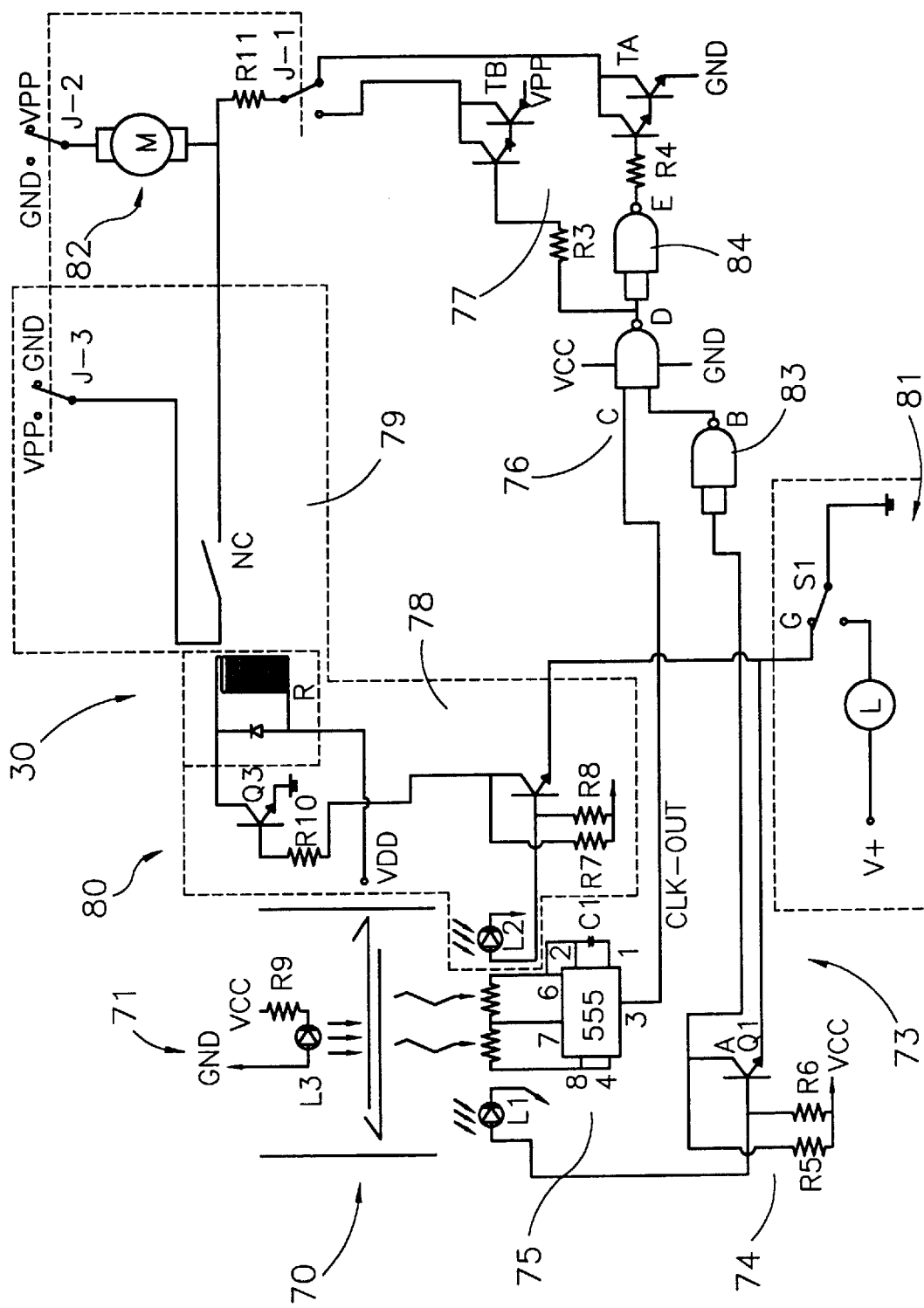
FIG. 6A is a diagram of the electric circuit of the present invention.
Figure 6B:
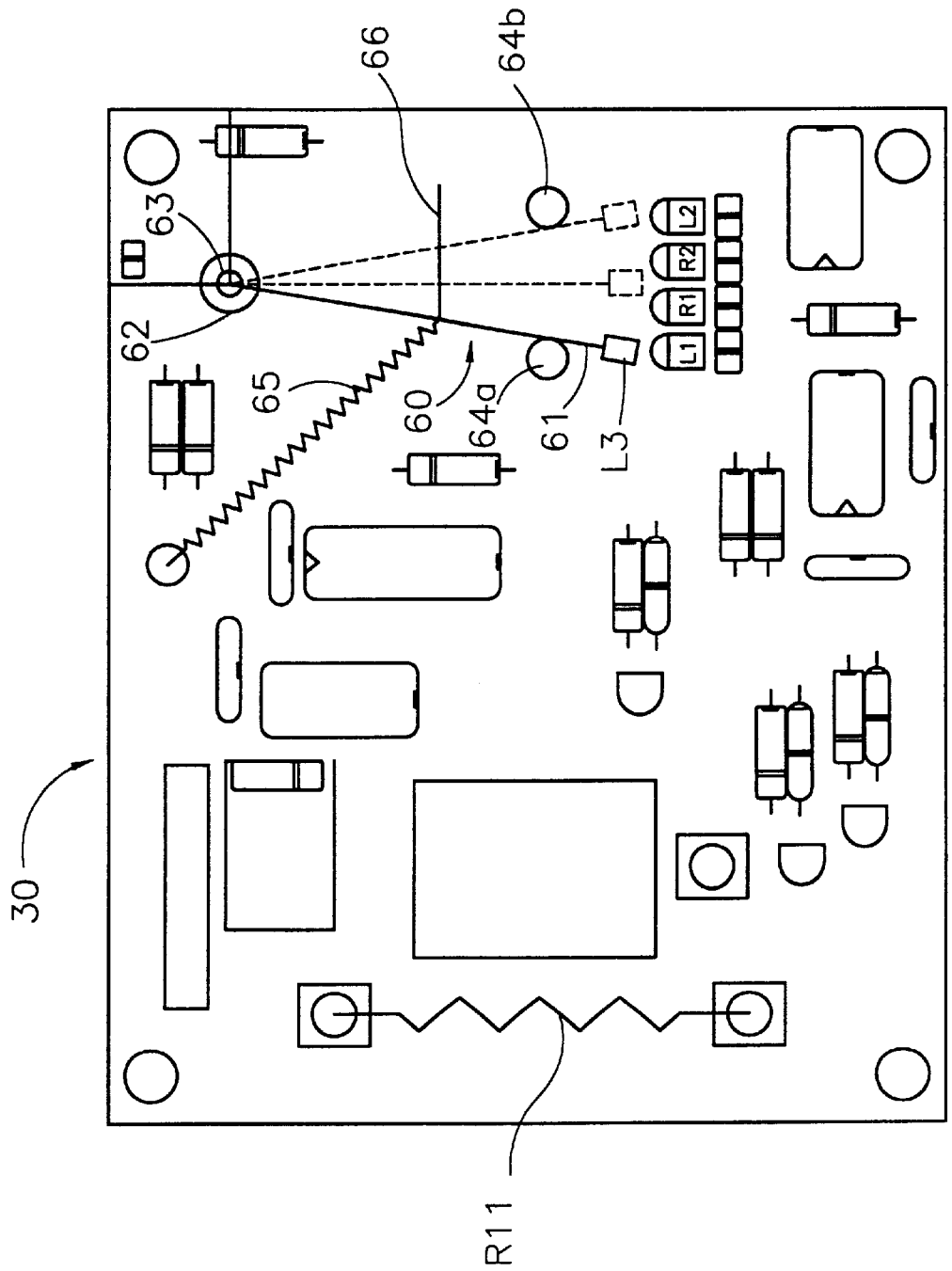
FIG. 6B is a schematic illustration of the control unit of the present invention.
Figure 6C:
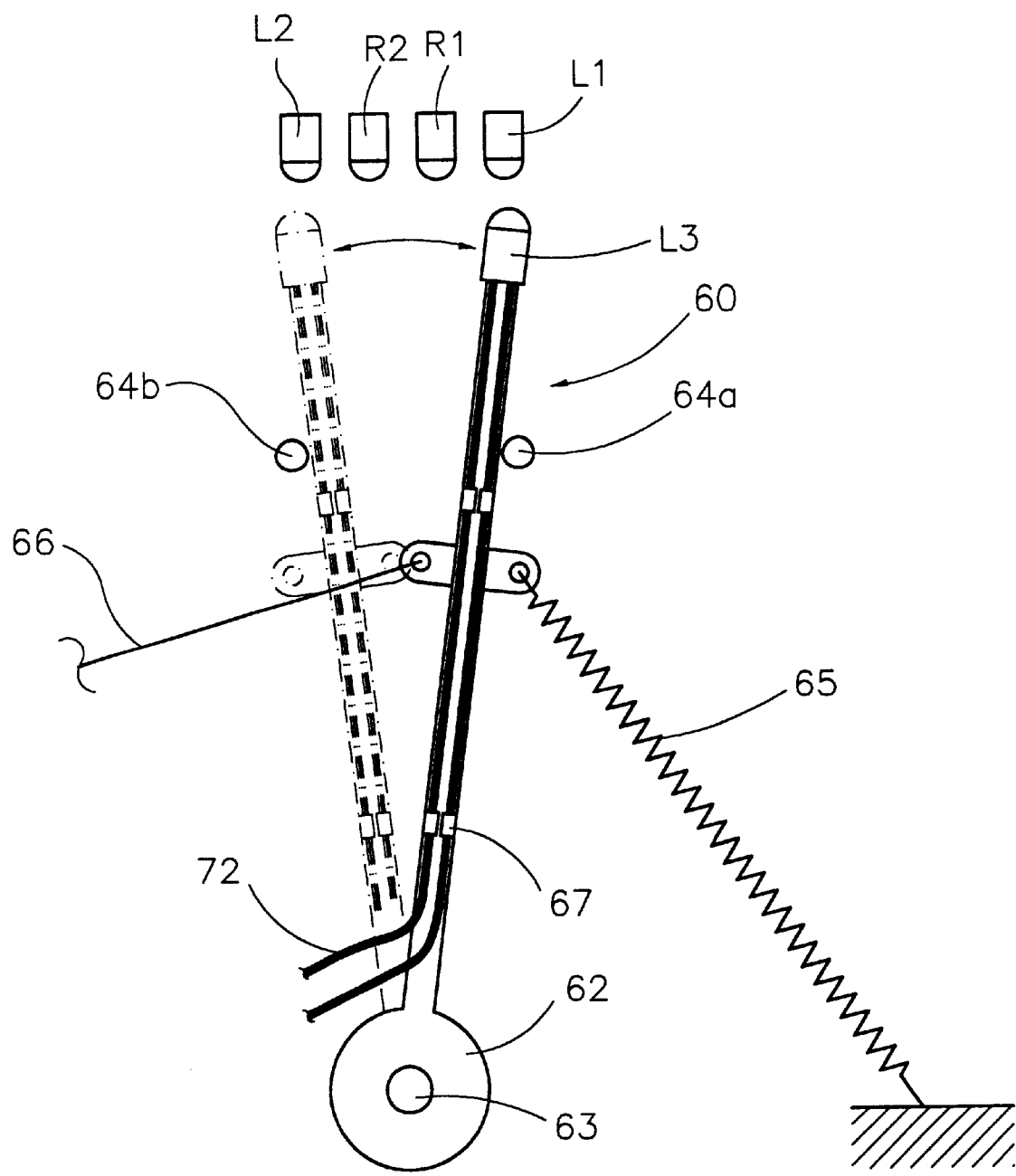
FIG. 6C is an enlarged schematic illustration of the control unit of the present invention.

Referring to FIGS. 6A–6C, the control unit 30 has a signal circuit 71 with an infrared transmitter L3 connected in series with a resistor R9, a frequency modulator circuit 73, a relay circuit 80, an interrupting circuit 81, a motor 82, and a speed controller 70.

The frequency modulator circuit 73 comprises: a switching circuit 74 with an NPN transistor Q1, switched by an infrared receiver L1 and having a collector pin A; a clock circuit 75, oscillating at a frequency that is controlled by photo-sensitive resistors R1, R2; an amplifier 76, receiving inputs from the switching circuit 74 via an inverter 83 and from the clock circuit 75; and a speed control circuit 77, having an NPN Darlington transistor TA, a PNP Darlington transistor TB, switches J1, J2, and a high-wattage resistor R1. The NPN and PNP Darlington transistors TA, TB are fed by the amplifier 76, with an inverter inserted between the amplifier 76 and the NPN Darlington transistor TA The relay circuit 80 comprises: a switching circuit 78 with NPN transistors Q2, Q3, switched by an infrared receiver L2; a relay R, alternatively an SCR, a MOSFET or an IGBT, having two protective diodes D1, D2; a switching circuit 79 with an NC switch, operated by the relay R and closed at rest; and a switch J3.

As shown in FIGS. 6B and 6C, the speed controller 70 has a swing arm 60 with a free end 61 and a hinge end 62, left and right stopping elements 64a, 64b, a hinge 63, a wire 66, and a spring 65. The infrared transmitter L3 of the signal circuit 71 is mounted on the free end 61 to give out a control signal. The wire 66 is attached to the swing arm 60 close to the hinge end 62 thereof for external control thereof. The left and right stopping elements 64a, 64b define a swing area of the swing arm 60 between a left position and a right position. The spring 65 is attached to the swing arm 60, pulling the swing arm 60 towards the left position after completing a control circle. Manual pulling of the wire 66 causes the free end 61 thereof to shift positions, with the infrared transmitter L3 shifting along and generating position signals in the infrared receiver L1, the photo-sensitive resistors R1, R2 and the infrared receiver L2 for switching and linear frequency modulation.

In a resting state, the swing arm 60 leans on the left stopping element 64a, with the infrared transmitter L3 pointing to the infrared receiver L1. After switching on power, the infrared transmitter L3 sends out a signal which is received by the infrared receiver L1, causing the transistor Q1 to switch to a conducting state with no voltage at the collector pin A thereof, corresponding to a digital value of 0. The inverter 83 converts this to a digital 1 on an output pin B thereof, feeding the amplifier 76. At the same time, the photo-sensitive resistors R1, R2 control the clock circuit 75 for generating clock pulses of a clock frequency. The photo-sensitive resistors R1, R2 have electrical resistances that are inversely proportional to the intensity of light received. Therefore, the clock frequency increases with shifting to the right of the infrared transmitter L3.

When the switch J1 closes the circuit through the Darlington transistor TA, the switch J2 is taken along to connect with supply voltage VPP. The NPN Darlington transistor TA is connected to the inverter 84 at an output pin E thereof, with the inverter 84 receiving input from the amplifier 76 at an input pin D. Switching of the NPN Darlington transistor TA is thus controlled by the clock signals, in turn driving the motor 82 in a positive direction. The high-wattage resistor R11 serves to protect the NPN Darlington transistor TA.

When the swing arm 60 has reached the right position, the infrared transmitter L3 illuminates the infrared receiver L2. Then the transistor Q2 of the switching circuit 78 starts to conduct, and the transistor Q3 has a low collector voltage and ceases to conduct. The relay 80 does not switch, allowing the NC switch to be at rest and to close. Then the switching circuit 79 connects a terminal of the motor 82 to ground via the switch J3.

Thus, in this moment, the motor 82 is disconnected from control by the frequency modulator circuit 73. On the other hand, since the infrared transmitter L3 illuminates the infrared receiver L1 are now far from each other, the transistor Q1, controlled by the infrared receiver L1, is nonconducting, with high voltage on the collector pin A, corresponding to a digital value of 1. Consequently, the pin B has a digital value of 0. This leads to no output voltage of the amplifier 76 and therefore no input to the NPN and PNP Darlington transistors TA, TB, as an additional protective measure.

When the bicycle 10 is braked, only a switch S1 in the interrupting circuit 81 has to be operated to cut the transistors Q1 and Q2 off ground. Then the pin B has a digital value of 0. This leads to no output voltage of the amplifier 76 and therefore no input to the NPN and PNP Darlington transistors TA, TB. Furthermore, since the transistor Q2 is not connected to ground, the transistor Q3 conducts, causing the relay 80 to switch, opening the NC switch. Disconnected from the frequency modulator circuit 73 and from power, the motor 82 stops.

In the first embodiment of the present invention, only the tension of the chain 12 is input to the control unit 30. The control unit 30 starts to move only after pushing the pedals 13. In a second embodiment of the present invention, acceleration of the bicycle 10 is sensed in another way.

Figure 7:
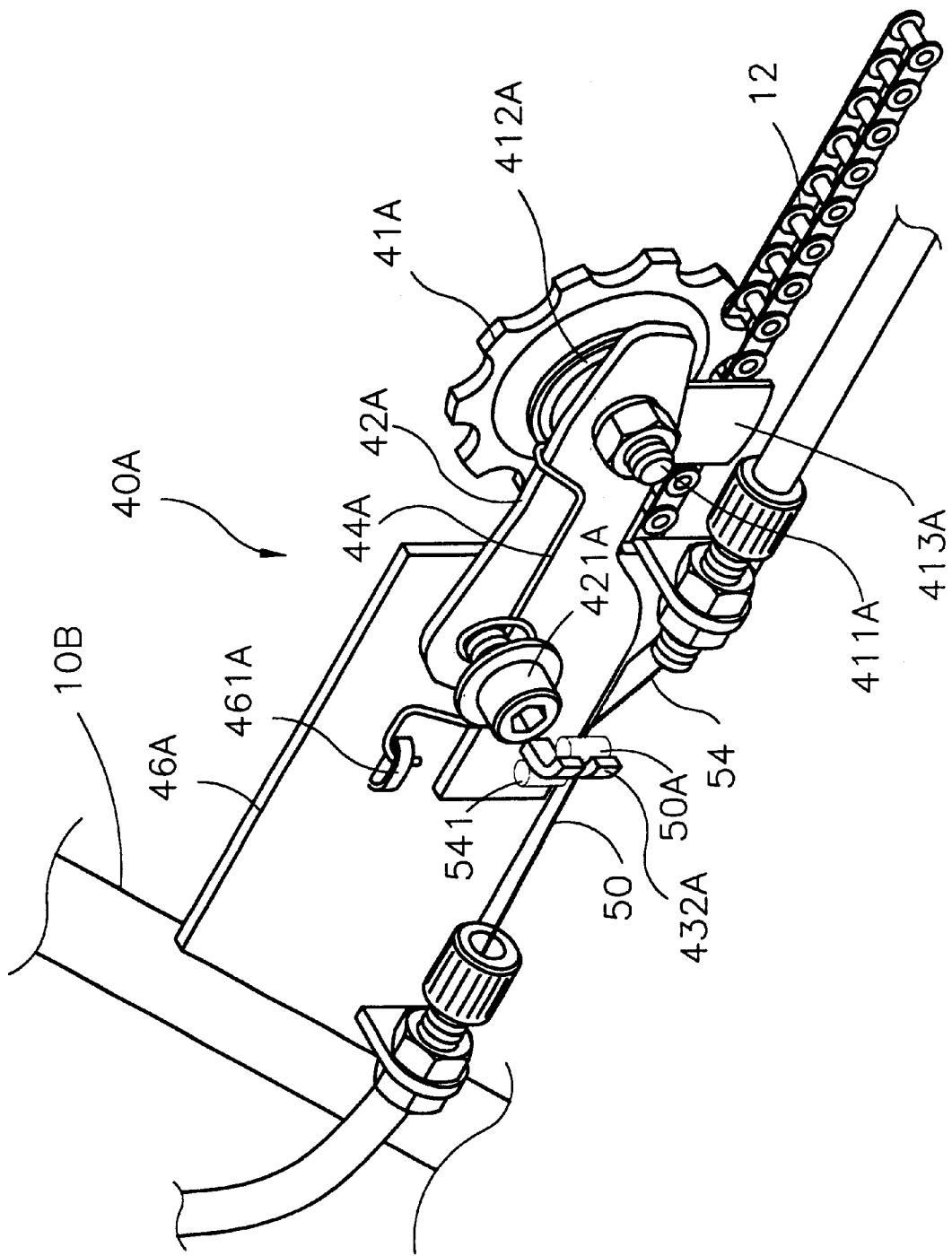
FIG. 7 is a perspective view of the present invention in the second embodiment.

Referring to FIG. 7, the bicycle 10 has a seat tube 10A and a seat stay 10B. The present invention in the second embodiment has a sensor unit 40A, fixed on the seat stay 10B close to the sprocket 15, contacting the chain 12 from above. The sensor unit 40A comprises a pinion 41A; a lever 42A with a free end; a first spring 44A; and a fixing plate 46A. The fixing plate 46A is mounted on the seat tube 10A. A screw 411A fixes the pinion 41A on the free end of the lever 42A. The pinion 41A engages with the chain 12, moving up and down, as led by the chain 12. The lever 42A is hingedly connected with the fixing plate 46A with a bolt 421A as an axis. Preferably, a split pin 412A secures the pinion 44A.

A hook 461A is attached to the fixing plate 46A. The spring 44A has an end which is held by the hook 461A, another end fixed on the lever 42A, and a middle section laid around the bolt 421A. Thus a downward pressing force of the lever 42A on the chain 12 is generated, deflecting the chain 12 downward. When the pedals 13 of the bicycle 10 are pushed, the tension of the chain 12 increases, and the chain 12 takes the pinion 41A upward. The spring 44A has an elastic force suitable to push the lever 42A and the pinion 41A down, after the tension of the chain 12 has decreased again.

A blocking element 432A is set on the lever 42A. From there, a secondary cable 54 leads to an accelerator handle (not shown). The cable 50 has a stopper 50A which is connected with the blocking element 432A on one side or the exterior thereof. In the same way, the secondary cable 54 has a stopper 541A which is connected with the blocking element 432A on another side or the interior thereof.

When the accelerator handle is operated, the secondary cable 54 is pulled, taking along the cable 50 by the blocking element 432A, so that corresponding information is passed to the control unit 30.

When the pinion 41A is raised by increased tension of the chain 12, taking along the lever 42A, the blocking element 432A pulls on the cable 50 to pass information to the control unit 30. Then the secondary cable 54 is displaced, as well.

Input to the control unit 30 is done independently by displacing the accelerating cable 54 or raising the pinion 41A. On the one hand, moving the lever 42A by changed tension of the chain 12 displaces the cable 50. On the other hand, operating the accelerating handle without stronger pedaling displaces the accelerating cable 54, which moves the lever 42A at the blocking element 432A and thus displaces the cable 50, passing information to the control unit 30.

As shown in FIG. 7, an embracing plate 413A encloses the pinion 41A and the chain 12 to prevent the pinion 41A from separating from the chain 12.

Figure 8:
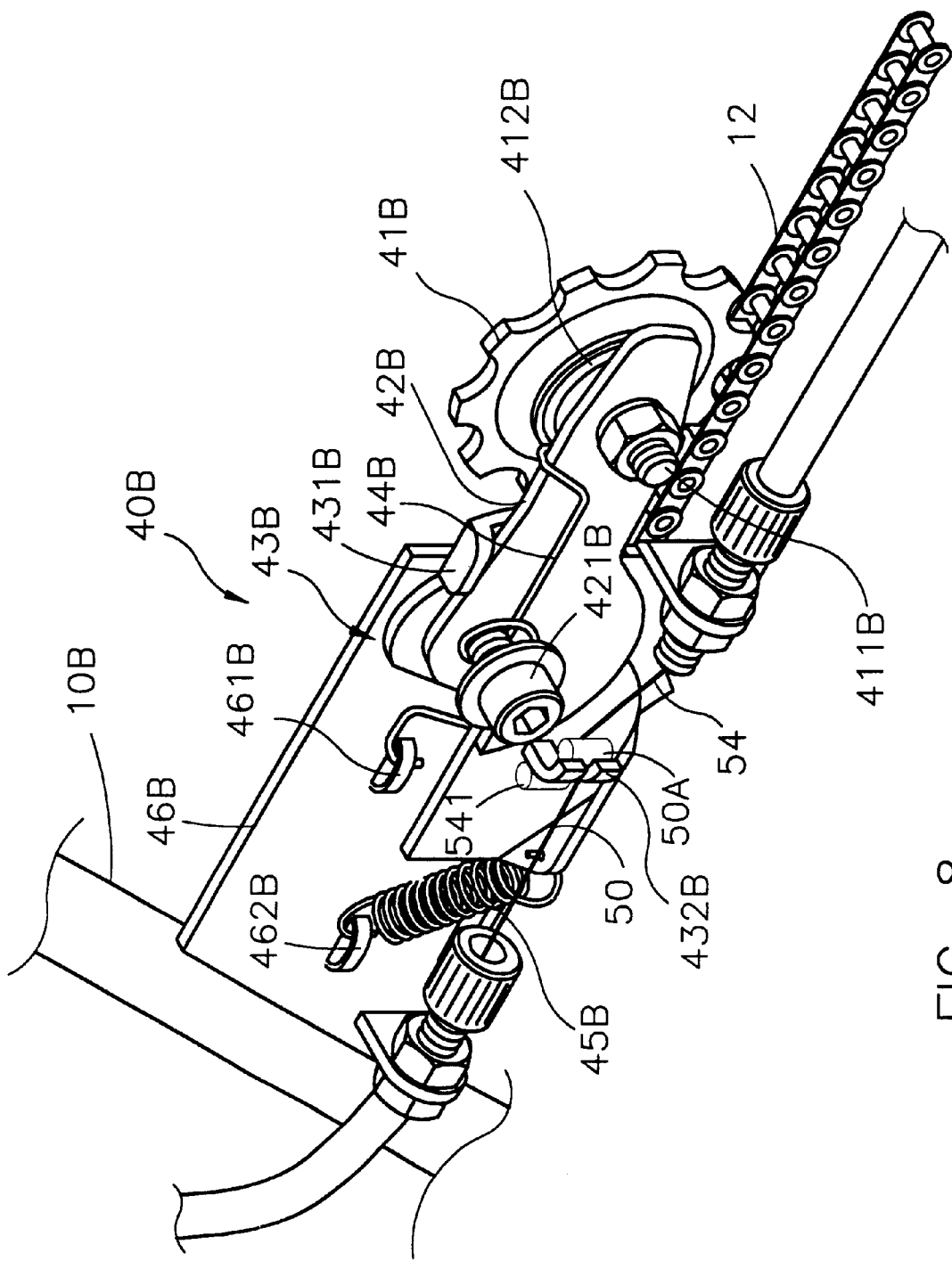
FIG. 8 is a perspective view of the present invention in the third embodiment.

Referring to FIG. 8, the present invention in a third embodiment has a sensor unit 40B which comprises a pinion 41B; a first lever 42B with a free end; a second lever 43B with a free end; a first spring 44B; a second spring 45B; and a fixing plate 46B. The fixing plate 46B is mounted on the seat tube 10A. A screw 411B fixes the pinion 41B on the free end of the first lever 42B. The pinion 41B engages with the chain 12, moving up and down, as led by the chain 12. The lever 42B is hingedly connected with the fixing plate 46B with a bolt 421B as a lever axis. The second lever 43B is fixed to the first lever 42B close to the lever axis, carrying a catch 431B.

A hook 461B is attached to the fixing plate 46B. The first spring 44B has an end which is held by the hook 461B, another end fixed on the first lever 42B, and a middle section laid around the bolt 421B. Thus a downward pressing force of the first lever 42B on the chain 12 is generated, deflecting the chain 12 downward. When the pedals 13 of the bicycle 10 are pushed, the tension of the chain 12 increases, and the chain 12 takes the pinion 41B upward. The first spring 44B has an elastic force suitable to push the first lever 42B and the pinion 41B down, after the tension of the chain 12 has decreased again.

The catch 431B serves to take the second lever 43B along with the first lever 42B. When the pinion 41B is lifted by increased tension of the chain 12, the first lever 42B is raised, taking along the second lever 43B by the catch 431B.

A second hook 462B is attached to the fixing plate 46B. The second spring 45B connects the hook 462B with the second lever 43B. With decreasing tension of the chain 12 which has pushed up the pinion 41B, the second spring 45B moves back the second lever 43B. A blocking element 432B is attached to the second lever 43B below the lever axis. The secondary cable 54 leads from the blocking element 432B to the accelerator handle (not shown). Furthermore, the near end of the cable 50 is connected with the blocking element 432B.

When the accelerator handle is operated, the secondary cable 54 is pulled, taking along the cable 50 by the blocking element 432B, so that corresponding information is passed to the control unit 30.

Displacing the secondary cable 54 moves the second lever 43B, without moving the first lever 42B.

As shown in FIG. 2, the sensor unit 40 is mounted on the seat tube 10A, with the pinion 44 engaging with the chain 12 from above near the chain wheel 14. If the bicycle 10 has a single sprocket 15, the sensor unit 40 is also mountable on the seat stay 10B, with the pinion. 44 engaging with the chain 12 from above near the sprocket 15. As shown in FIGS. 7 and 8, the sensor unit 40A, 40B is mounted on the seat stay 10B, with the pinion 41A, 41B engaging with the chain 12 from above near the sprocket 15. If the bicycle 10 has a single chain wheel 14, the sensor unit 40 is also mountable on the seat tube 10A, with the pinion 41A, 41B engaging with the chain 12 from above near the chain wheel 14.

The advantages of the present invention are:

1. When the pedals 13 are pushed, the chain 12 rises, causing the control unit 30 to output more supplemental power.

2. When the pedals 13 are pushed stronger, as for increasing speed, the chain 12 rises, shifting the cable 50 for additional supplemental power.

3. Without pedaling, no power is output, saving electrical energy.

4. Supplemental power is delivered according to a cyclist's demands.

5. When going uphill, even without using the accelerator handle, stronger pedaling leads to higher output of supplemental power.

6. When going downhill without pedaling, supplemental power is turned off, avoiding danger by too high speed.

7. Operating the accelerator handle increases supplemental power, allowing to cycle without physical effort.

8. The present invention is simple and effective.

9. The present invention is easily installed.

10. Cycling is possible with physical effort only, with physical effort and supplemental power, or with supplemental power only.

While the invention has been described with reference to preferred embodiments thereof, it is to be understood that modifications or variations may be easily made without departing from the spirit of this invention which is defined by the appended claims.

What is claimed is:

1. A control system for a motor-assisted bicycle, comprising:

a chain that drives said bicycle, and a driving device that outputs supplemental power; wherein said control system comprises a control unit to control a power output level of said driving device, a sensor unit comprising a holding plate mounted on said motor-assisted bicycle, a lever pivotally mounted on said holding plate, an engaging element mounted on an end of said lever such that said engaging element engages said chain from above, and a spring having an elastic force which urges said engaging element against said chain, and a cable connecting said lever to said control unit, there being a plurality of connection points on said-lever to connect said cable to said lever, each said connection point establishing a different effective lever arm length of said lever, thereby allowing a user to vary an amount of force necessary to displace said cable; and wherein changing tension of said chain causes a movement of said lever of said control unit, said movement of said lever being transmitted by said cable to said control unit to control said power output level of said driving device.

2. A control system for a motor-assisted bicycle according to claim 1, wherein:

said motor-assisted bicycle has a frame, and said holding plate is a frame body mounted thereon.

3. A control system for a motor-assisted bicycle according to claim 1, wherein:

said control system further comprises an adjusting mechanism comprising an adjusting screw, said adjusting screw being connected to said spring such that turning said adjusting screw changes said elastic force of said spring.

4. A control system for a motor-assisted bicycle according to claim 1, wherein:

said lever-further comprises a contact arm with said engaging element at an end thereof, a pulling arm linked to said contact arm, said spring and said cable being connected to an end of said pulling arm such that said spring pulls on said pulling arm and a movement of said pulling arm displaces said cable, and a bolt located between said contact arm and said pulling arm and fixed on said holding plate for pivotally connecting said lever and said holding plate.

5. A control system for a motor-assisted bicycle according to claim 1, wherein:

a flexible guiding tube covers said cable, said flexible guiding tube having a threaded end for adjusting relative positions of said cable and said lever.

6. A control system for a motor-assisted bicycle according to claim 1, wherein:

said engaging element is a pinion.

7. A control system for a motor-assisted bicycle according to claim 4, wherein:

said effective lever arm length of said lever is varied by securing an, end of said cable in a given one of a plurality of incisions in a connecting plate attached to said pulling arm.

* * * * *